United States Patent
Ionescu et al.

(10) Patent No.: US 10,972,486 B2
(45) Date of Patent: Apr. 6, 2021

(54) CYBER SECURITY SYSTEM FOR INTERNET OF THINGS CONNECTED DEVICES

(71) Applicant: Cyberswarm, Inc., Ploiesti (RO)

(72) Inventors: Octavian Ionescu, Ploiesti (RO); Zoran Constantinescu, Ploiesti (RO); Bogdan Catalin Serban, Buchare (RO); Octavian Buiu, Buchare (RO); Andrei Buiu, Buchare (RO)

(73) Assignee: Cyberswarm, Inc., Ploiesti (RO)

( * ) Notice: Subject to any disclaimer, the term of this patent is extended or adjusted under 35 U.S.C. 154(b) by 238 days.

(21) Appl. No.: 16/176,638

(22) Filed: Oct. 31, 2018

(65) Prior Publication Data
US 2019/0132340 A1    May 2, 2019

Related U.S. Application Data

(60) Provisional application No. 62/579,230, filed on Oct. 31, 2017.

(51) Int. Cl.
*H04L 29/06* (2006.01)

(52) U.S. Cl.
CPC ...... *H04L 63/1416* (2013.01); *H04L 63/0227* (2013.01); *H04L 63/145* (2013.01)

(58) Field of Classification Search
CPC ............. H04L 63/1416; H04L 63/0227; H04L 63/145
See application file for complete search history.

(56) References Cited

U.S. PATENT DOCUMENTS

| | | | | |
|---|---|---|---|---|
| 4,967,400 A | * | 10/1990 | Woods | G01V 1/22 367/21 |
| 6,504,693 B1 | | 1/2003 | Moffat et al. | |
| 2006/0117385 A1 | * | 6/2006 | Mester | H04L 51/12 726/22 |
| 2013/0317693 A1 | * | 11/2013 | Jefferies | G07B 15/00 701/31.5 |
| 2016/0285308 A1 | * | 9/2016 | Douer | H02J 7/34 |
| 2017/0004318 A1 | * | 1/2017 | Griffith | G06F 21/85 |
| 2017/0163029 A1 | * | 6/2017 | Hong | H02H 7/263 |
| 2017/0230832 A1 | | 8/2017 | Ophir et al. | |

FOREIGN PATENT DOCUMENTS

CN    104571055    4/2015

OTHER PUBLICATIONS

International Search Report in PCT/IB/2018/058563 dated Feb. 21, 2019.
Written Opinion in PCT/IB/2018/058563 dated Feb. 21, 2019.

* cited by examiner

*Primary Examiner* — Meng Li
(74) *Attorney, Agent, or Firm* — DLA Piper LLP (US)

(57) ABSTRACT

A security system may include a normally open relay between an external network connection and at least one internal network connection, a network controller, and a microcontroller. The network controller may be configured to monitor for malicious activity on an external network accessible through the external network connection. The microcontroller may be configured to cause the normally open relay to temporarily close in response to the network controller failing to detect the malicious activity for a predetermined amount of time and cause the normally open relay to remain open and generate an alert in response to the network controller detecting the malicious activity.

12 Claims, 3 Drawing Sheets

CYBER SECURITY SYSTEM FOR INTERNET OF THINGS CONNECTED DEVICES

CROSS-REFEREN CROSS-REFERENCE TO RELATED APPLICATIONS

This application is based on and derives the benefit of the filing date of U.S. Patent Application No. 62/579,230, filed Oct. 31, 2017. The entire content of this application is herein incorporated by reference in its entirety.

BRIEF DESCRIPTIONS OF THE DRAWINGS

DETAILED DESCRIPTIONS OF SEVERAL EMBODIMENTS

Cyber security threats have escalated dramatically in the past few years. Many networked devices, such as IoT (Internet of Things) devices, may be vulnerable to cyber security threats. Such devices may need to be protected against unauthorized interference from people and/or other devices. Unauthorized access may allow cyber criminals to modify parameters of a user's devices and thus to make their life miserable, for example.

Figure 1:
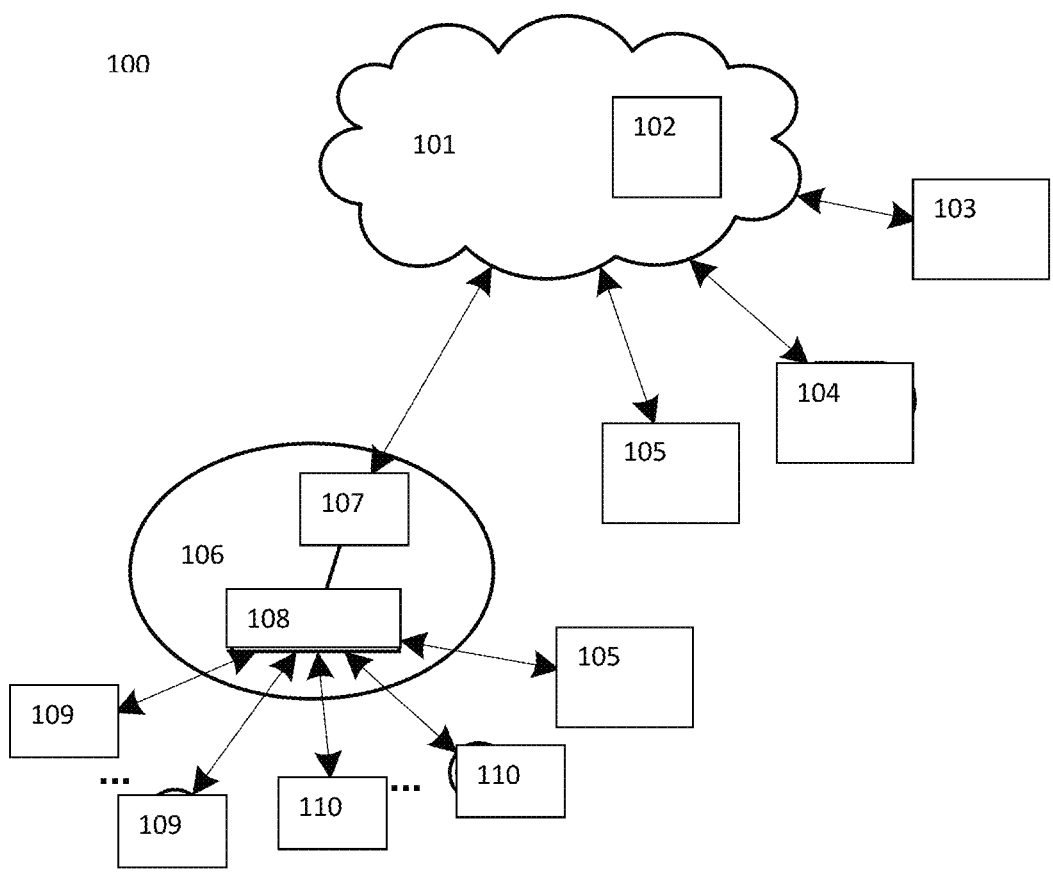
FIG. 1 is a network according to an embodiment of the disclosure.

FIG. 1 is a network 100 according to an embodiment of the disclosure. Some components of network 100 may include the cloud 101, which may include one or more servers 102 and/or other devices configured to provide persistent network services through the Internet or another publicly-accessible network. Elements configured to communicate using cloud 101 may include user remote server 103, data analytics system 104, user mobile device 105 (e.g., smart phone, tablet, laptop, etc.), and/or Internet gateway 107 of IoT network 106. IoT network 106 may be a local network allowing one or more IoT devices to access cloud 101 through Internet gateway 107. For example, such devices may include local hub or switch 108, sensors 109, and/or actuators 110.

One weak point in the architecture of FIG. 1 may arise because the IoT sensors 109 and actuators 110 are connected to the cloud server 102 via the Internet gateway 107, which may have weak software protection (e.g., firewall, encryption etc.) and, accordingly, the entire IoT network 106 may rely exclusively on software security tools. This may be contrasted with industrial applications/systems that may use a multi-layered security system that involves firewalls, encryption, honeypots, intrusion detection/prevention systems (IDS/IPS), anti-malware scanners, security information and event management (SIEM), and/or highly trained security teams who may be available at all times. Critical infrastructure, for example big plants and/or governmental facilities, where the safety is an important issue may even be organized based on a M2M (machine to machine) architecture, wherein all communication is implemented on layers and levels with the input and output gateways being very well protected.

Figure 2:
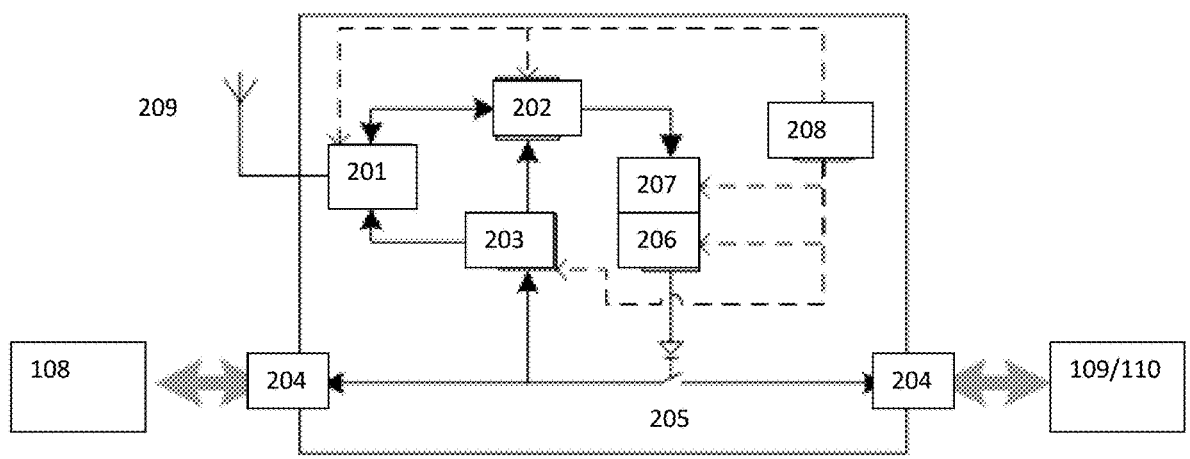
FIG. 2 is a cyber security system according to an embodiment of the disclosure.

FIG. 2 is a cyber security system 200 according to an embodiment of the disclosure. Cyber security system 200 may protect IoT connected devices with limited resources. In some embodiments, cyber security system 200 may add an additional, independent communication channel which may control a physical communication line between the IoT devices and the cloud (e.g., a physical Ethernet line). In some embodiments, cyber security system 200 may select IoT connected device(s) that are allowed to connect and may establish the right of IoT connected device(s) to read data from sensors and/or modify status of actuators.

Cyber security system 200 may be connected between any network (e.g., Ethernet-connected) switch/router 108 and one or more network-enabled IoT devices 109/110. Cyber security system 200 may include mobile telephony communication transceiver 201 (e.g., which may be configured to communicate via GSM, GPRS, 3G, 4G, 5G, etc.), microcontroller 202, Ethernet or other network connection controller 203 (which may be read only in some embodiments), Ethernet or other network connection connectors 204, circuit breaker 205, relay 206, relay actuator 207, power supply 208, and/or communication antenna 209. Cyber security system 200 may be connected between switch/router 108 and one or more network-enabled IoT devices 109/110 on any physical transmission line (e.g., Ethernet line) through connectors 204.

Figure 3:
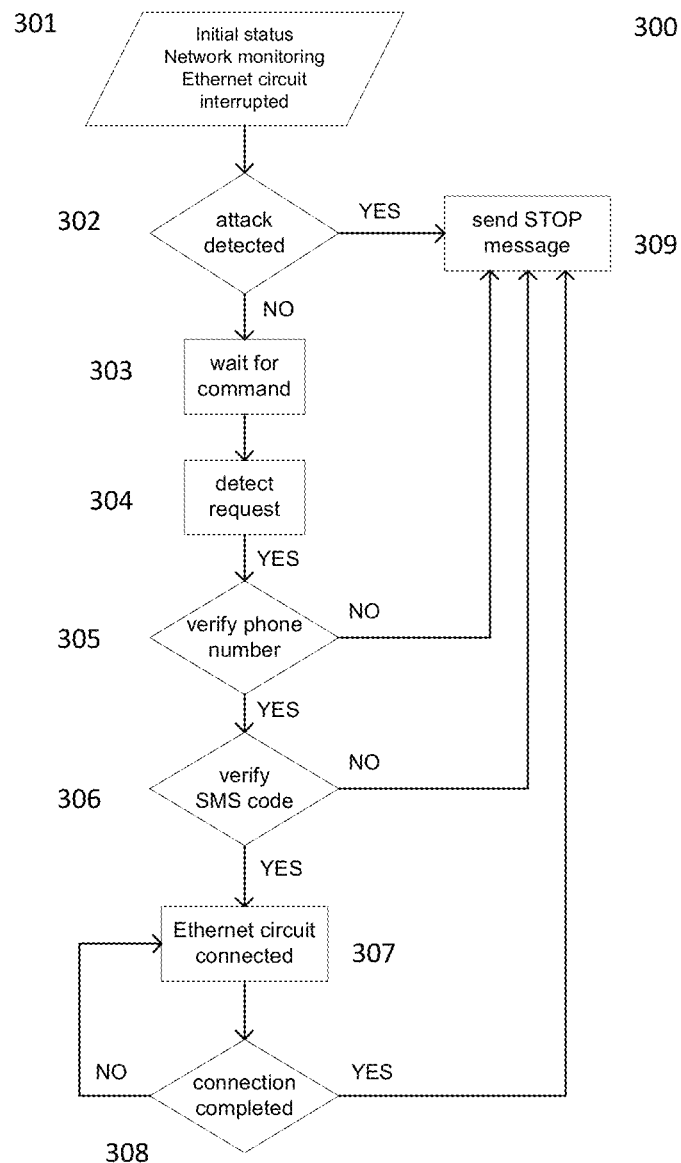
FIG. 3 is a cyber security method according to an embodiment of the disclosure.

FIG. 3 is a cyber security method 300 according to an embodiment of the disclosure. Cyber security method 300 may be performed by cyber security system 200. While cyber security method 300 is presented in the context of managing an Ethernet connection, system 200 may be used in the same manner for the protection of sensors and actuators which are connected through CAN, Modbus, etc.

At 301, cyber security system 200 may be in an initial status wherein the physical transmission line is disrupted by the normally open contacts of relay 206. During this time, network controller 203 may monitor network traffic data through switch/router 108. Microcontroller 202 may analyze the traffic.

If, at 302, microcontroller 202 detects one or more illegitimate activities in the traffic, process 300 may proceed to 309 where microcontroller 202 may warn the IoT network 106 owner and/or admin, using transceiver 201 and antenna 209 (e.g., through SMS messages or other communications), that it may be unsafe to connect the IoT devices 109/110 to the router 108. Microcontroller 202 may also lock the system traffic (e.g., by maintaining relay 206 open).

If, at 302, microcontroller 202 does not detect illegitimate activities for an established period of time, microcontroller 202 may cause actuator 207 to close relay 206 in some embodiments.

In some embodiments, cyber security system 200 may be configured to respond to user requests to allow communications by the IoT device 109/110. For example, at 303, microcontroller 202 may wait for a command from a user. At 304, transceiver 201 may detect a command from the user. For example, the owner and/or admin may send an SMS message or other communication to unlock the transmission line.

At 305, microcontroller 202 may verify the telephone number to determine whether it is a number recognized as belonging to a valid owner and/or admin (e.g., microcontroller 202 may have been preconfigured with knowledge of this number in memory). If the phone number is not valid, process 300 may proceed to 309 where microcontroller 202 may warn the IoT network 106 owner and/or admin, using transceiver 201 and antenna 209 (e.g., through SMS messages or other communications), that it may be unsafe to connect the IoT devices 109/110 to the router 108. Microcontroller 202 may also lock the system traffic (e.g., by maintaining relay 206 open).

If the identity of the owner or admin is confirmed at 305, the second step of safety may be to verify the content of SMS message. At 306, microcontroller 202 may examine the content of the SMS message to determine whether it matches an established message (e.g., microcontroller 202 may have been preconfigured with knowledge of this message in memory). If the message is not valid, process 300 may proceed to 309 where microcontroller 202 may warn the IoT network 106 owner and/or admin, using transceiver 201 and antenna 209 (e.g., through SMS messages or other communications), that it may be unsafe to connect the IoT devices 109/110 to the router 108. Microcontroller 202 may also lock the system traffic (e.g., by maintaining relay 206 open). Note that in some embodiments, number and message validation steps may be performed in a reverse order from that described here (e.g., verify message first, then number).

If the content of the message corresponds to the one established, at 307, microcontroller 202, through relay actuator 207, may command the relay 202 to close. Thus the transmission line may be opened and data may flow between IoT devices 109/110 and router 108. The transmission line may be connected for an established period of time and, when the time elapses, at 308, microcontroller 202, through relay actuator 207, may command relay 206 to open and interrupt the transmission line.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A security system comprising:
a normally open relay between an external network connection and at least one internal network connection;
a network controller configured to monitor for malicious activity on an external network accessible through the external network connection; and
a microcontroller configured to:
cause the normally open relay to temporarily close in response to the network controller failing to detect the malicious activity for a predetermined amount of time; and
cause the normally open relay to remain open and generate an alert in response to the network controller detecting the malicious activity.

2. The security system of claim 1, further comprising a transceiver configured to communicate with at least one external device.

3. The security system of claim 2, wherein the microcontroller is configured to transmit the alert by the transceiver.

4. The security system of claim 2, wherein the microcontroller is further configured to:
receive a command to close the normally open relay by the transceiver;
analyze the command to determine whether the command is valid;
cause the normally open relay to temporarily close in response to determining that the command is valid; and
cause the normally open relay to remain open and generate an alert in response to determining that the command is invalid.

5. The security system of claim 4, wherein the microcontroller is configured to analyze the command by determining a phone number from which the command was sent and determining whether the phone number matches a predetermined phone number.

6. The security system of claim 4, wherein the microcontroller is configured to analyze the command by determining a data content of the command and determining whether the data content matches a predetermined data content.

7. A security method comprising:
monitoring, by a network controller, for malicious activity on an external network accessible through an external network connection; and
a microcontroller configured to:
causing, by a microcontroller, a normally open relay between the external network connection and at least one internal network connection to temporarily close in response to the network controller failing to detect the malicious activity for a predetermined amount of time; and
causing, by the microcontroller, the normally open relay to remain open and generating, by the microcontroller, an alert in response to the network controller detecting the malicious activity.

8. The security method of claim 7, further comprising communicating, by a transceiver, with at least one external device.

9. The security method of claim 8, wherein the communicating includes transmitting, from the microcontroller, the alert to the at least one external device.

10. The security method of claim 8, wherein the communicating includes receiving, from the at least one external device, a command to close the normally open relay, the method further comprising:
analyzing, by the microcontroller, the command to determine whether the command is valid;
causing, by the microcontroller, the normally open relay to temporarily close in response to determining that the command is valid; and
causing, by the microcontroller, the normally open relay to remain open and generate an alert in response to determining that the command is invalid.

11. The security method of claim 10, wherein the analyzing includes determining a phone number from which the command was sent and determining whether the phone number matches a predetermined phone number.

12. The security method of claim 10, wherein the analyzing includes determining a data content of the command and determining whether the data content matches a predetermined data content.

\* \* \* \* \*